COILS 31, 32 BETWEEN TAPS A & B ———————
COILS 33, 34 BETWEEN TAPS B & C —·——·——·—
COILS 35, 36 BETWEEN TAPS C & A — — — — —

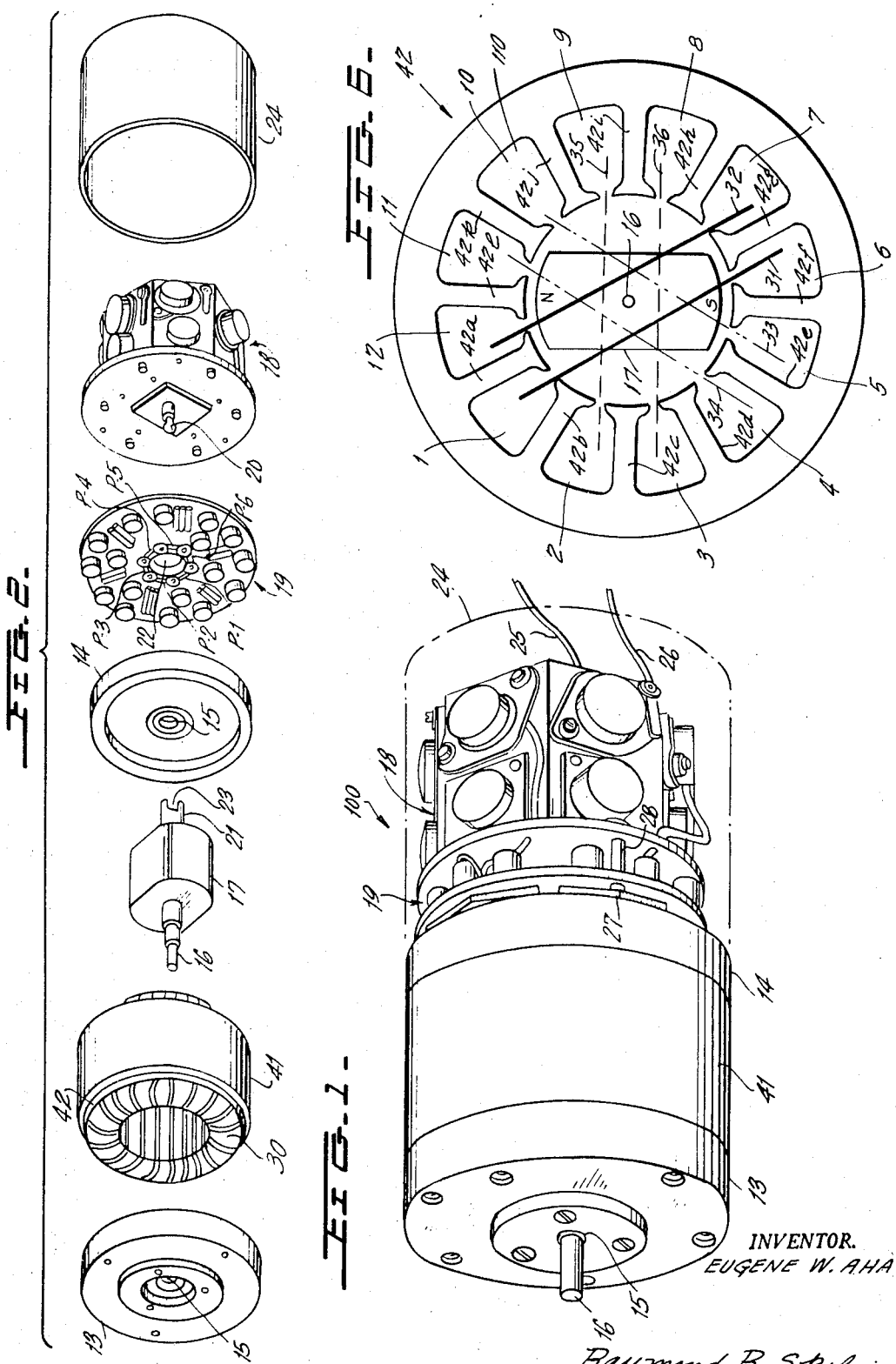

INVENTOR.
EUGENE W. AHA
BY
Raymond R. Skolnick

United States Patent Office 3,444,406
Patented May 13, 1969

3,444,406
TWELVE-SLOT, SIX COIL, SHORT-CHORDED, SINGLE-LAYER ARMATURE WINDING FOR BRUSHLESS DC MOTOR
Eugene W. Aha, Bristol, Tenn., assignor to Sperry Rand Corporation, Bristol, Tenn., a corporation of Delaware
Filed Apr. 28, 1966, Ser. No. 546,040
Int. Cl. H02h 29/02
U.S. Cl. 310—195       5 Claims

ABSTRACT OF THE DISCLOSURE

A brushless D.C. motor is constructed with a single layer armature winding divided into three delta connected sections, with each section consisting of two concentric coils connected in series. The armature iron is divided into twelve poles and each coil spans five of these poles.

---

This invention relates to electric motors in general and more particularly relates to a brushless D.C. motor having a novel armature construction.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In conventional direct current motors, commutation is essentially a mechanical switching operation by which currents through the various armature conductors are advanced and cyclically reversed in sequence as a function of rotor position. This continuous switching process is accomplished by means of brushes and a segmented commutator so the commutation is unavoidably accompanied by friction, wear, and sparking with its attendant generation of RF noise. These disadvantages of commutation frequently prohibit the utilization of D.C. motors in critical applications, such as space or high altitude vehicles, even though the performance characteristics and input requirements favor the use of a D.C. motor in all other respects.

In order to reduce the magnitude of current pulsations in the conductors of a motor armature the number of commutating intervals per rotor revolution must be increased. However, in a brushless D.C. motor the size of the switching elements are so significant that they impose practical limitations on the number of commutating intervals. In order to reduce the number of switching elements and still obtain smooth motor operation by providing many commutating intervals, the brushless D.C. motor disclosed in the copending application of Roy K. Hill, Ser. No. 524,016, filed Feb. 1, 1966, now U.S. Patent 3,377,-534, and assigned to the assignee of the instant invention, includes a stationary armature whose windings are connected in a closed loop having three commutating taps and six solid state switching circuits whereby six commutating intervals are obtained per rotor revolution.

For space applications reduction of motor weight is a prime consideration. It has been found that with all other motor parameters being equal, an armature winding with an odd number of taps has a lower resistance than an armature winding with an even number of taps. That is, the resistance of a three-tap winding is approximately 11% less than the resistance of a six-tap winding. However this advantage diminishes as the number of taps increases.

Armature weight may be further reduced by using concentric, chorded coils. This produces the same magnetic effect with less end winding length than winding configurations utilizing full pitch coils.

In particular, the instant invention simplifies armature construction by reducing the number of stator coils and provides a lightweight construction without downgrading performance. This is accomplished by providing a twelve slot rotor and a delta connected armature winding having two serially connected concentric coils connected between adjacent winding taps. Each of these coils spans only five slots as compared to full pitch coils which would span six slots. In addition there is a total of only twelve coil sides with each of the sides being disposed within a different one of the armature slots as contrasted to conventional construction in which at least two coil sides are disposed within each slot.

Accordingly, a primary object of the instant invention is to provide an electric motor which is especially lightweight, compact, of simplified construction and possesses superior operating characteristics.

Another object is to provide an electric motor having a novel armature construction.

Still another object is to provide an armature construction having two serially connected coils connected between adjacent armature taps with these coils being concentric and chorded.

A further object is to provide an armature means in which each slot of the pole structure contains only one coil side.

A still further object is to provide an electric motor armature with a pole structure having twelve slots, and a three-tap winding having six coils with the coils for each phase being concentric and each coil having its sides span five poles.

These as well as other objects of this invention will become readily apparent after reading the following description of the accompanying drawings in which:

FIGURE 1 is a perspective of a brushless D.C. motor constructed in accordance with the teachings of the instant invention.

FIGURE 2 is an exploded perspective of the motor of FIGURE 1.

FIGURE 6 is an end view in schematic form of the armature winding and pole structure illustrated in FIGURE 5.

Figure 5:
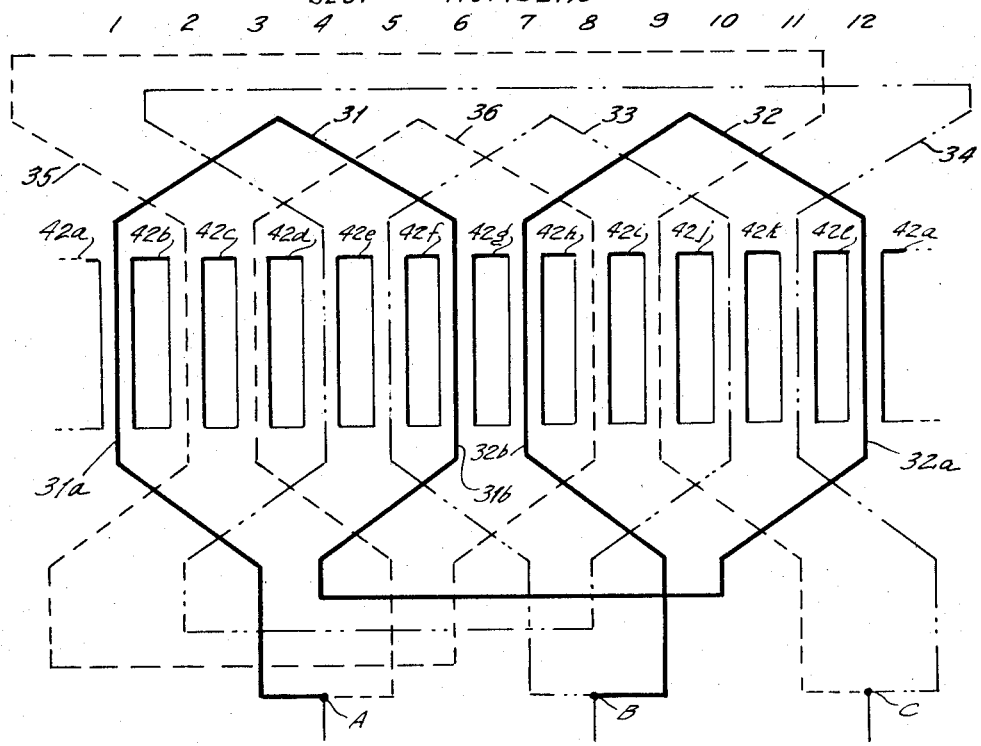
FIGURE 5 is a diagram of the armature winding and pole structure.
Figures 3, 4:
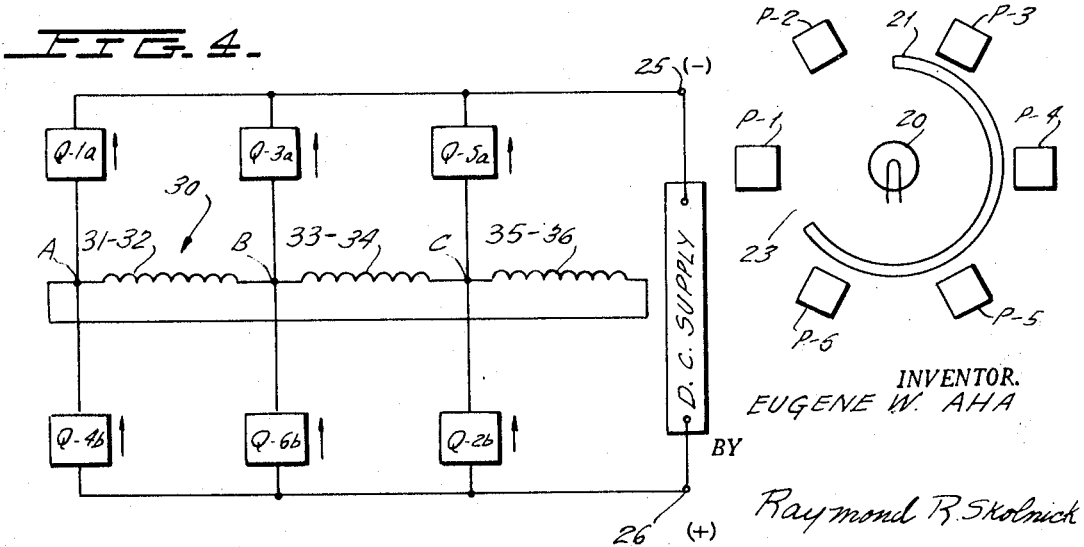
FIGURE 3 is a schematic representation of the rotor position detecting portion of the motor illustrated in FIGURES 1 and 2.
FIGURE 4 is a schematic illustrating the stationary armature winding and its connections to the D.C. energizing source through unidirectional electronic switching devices.

Now referring to the figures and more particularly to FIGURES 1 through 4. Brushless D.C. motor 100 comprises shell 41 which surrounds stationary magnetic frame or pole structure 42 having armature winding 30 mounted thereto. The ends of shell 41 are covered by front and back end caps 13, 14, respectively, each provided with suitable bearings 15 rotatably supporting motor shaft 16. Permanent magnet rotor 17 is keyed to shaft 16 and is disposed within pole structure 42. Cover 24 is provided as an enclosure for the elements to the rear of end cap 14. An appropriate aperture (not shown) is provided through cover 24 to permit the passage of leads 25, 26 for connecting motor 10 with source of D.C. power.

Winding 30 consists of six multi-turned coils 31 through 36 joined in a closed loop. Three equally spaced taps or juncture points A, B and C divide winding 30 into three phases or sections each consisting of two serially connected coils. That is, coils 31, 32 extend between taps A and B, coils 33, 34 extend between taps B and C and coils 35, 36 extend between taps C and A.

As explained in detail in the aforesaid copending application Ser. No. 524,016, brushless commutation is achieved by means of solid state power switching unit 18 and solid state control and preamplifier unit 19 controlled by light source 20 and shield 21. Units 18 and 19 are mounted to the rear of end cap 14, being operatively positioned by means of appropriate spacers 27, 28. Preamplifier unit 19 includes a plurality of photoelectric devices P-1 through P-6 equally spaced from each other and circularly arranged about shield 21.

Light source 20 is mounted to power switching unit 18 on the forward side thereof and extends through central aperture 22 of preamplifier unit 19 into the interior of shield 21. Shield 21 is keyed to motor shaft 16 and is disposed rearwardly into cap 14 extending through aperture 22. Shield 21 is provided with aperture 23 so positioned and shaped that light emanating from source 20 passing through aperture 23 impinges upon at least two of the photoelectric devices P-1 through P-6 for any position of rotor 17 thereby making motor 100 self-starting.

Photoelectric devices P-1 through P-6 are of a type well known to the art which possesses two states of conduction. That is, low conductance or high impedance when not illuminated and high conductance or low impedance when illuminated. Since the position of rotor 17 determines the position of shield 21 and aperture 23, the position of rotor 17 determines which photoelectric devices are illuminated. Aperture 23 is wide enough to always illuminate at least two photoelectric devices for any position of shield 21. A third photoelectric device will also be illuminated for a small angle of overlap which, as will hereinafter become apparent, insure that armature 12 will always be energized for starting at all positions of shaft 16. Members Q-1a, Q-2b, Q-3a, Q-4b, Q-5a and Q-6b are solid state switching elements of the transistor family operated as on-off saturated switches which, in the "on" state, act as unidirectional current devices providing low impedance to current flowing in the directions indicated by the respective arrows in FIGURE 4.

Photoelectric device P-1 is connected to operate transistor Q-1a to the saturated "on" state when illuminated and allow Q-1a to remain in the "off" state when not illuminated. Likewise, P-2 operates Q-2b, P-3 operates Q-3a, P-4 operates Q-4b, P-5 operates Q-5a, and P-6 operates Q-6b. At the position shown in FIGURE 3 for shield 21 and aperture 23, photoelectric devices P-1 and P-2 are illuminated by light from source 20 passing through aperture 23 while shield 21 blocks passage of light to photoelectric devices P-3, P-4, P-5 and P-6. Thus, P-1 operates switching element Q-1a electrically connecting juncture A of winding 30 to line 25 extending to negative terminal of the D.C. power source, and P-2 operates switching element Q-2b electrically connecting juncture C of winding 30 to line 26 extending to the positive terminal of the D.C. power source.

Under these circumstances, two parts of parallel current paths exist in winding 30 between junctures A and C. One part consists of multi-turn coils 31 through 34 in series and the other part consists of multi-turn coils 35 and 36. Electron current flow in these paths produces a magnetic flux pattern which is pre-arranged to be near space quadrature with the field of magnetized rotor 17 such that the rotor will seek magnetic alignment with the field of armature winding 30 in a predetermined direction, for example, clockwise rotation.

As the rotor 17 rotates clockwise, it carries shield 21 along until aperture 23 also allows passage of light to photoelectric device P-3. At this position, photoelectric devices P-1, P-2 and P-3 are illuminated operating switching elements Q-1a, Q-2b, and Q-3a to the "on" state. Under these new circumstances, Q-1a electrically connects juncture A to line 25, Q-2b electrically connects juncture C to line 26, and Q-3a electrically connects juncture B to line 25, and different parallel current paths exist from the D.C. power source at line 26, through winding 30 to junctures B and C. One part of the new parallel current paths exists in coils 33 and 34 and the second part exists in coils 35 and 36. This new current path advances the stationary armature flux orientation 30 degrees clockwise from the first recited condition.

As the rotor continues to rotate clockwise, it carries shield 21 to the position where light is blocked to photoelectric device P-1, leaving only devices P-2 and P-3 illuminated. At this third position, P-2 operates Q-2b electrically connecting juncture C to line 26, and P-3 operates Q-3a electrically connecting juncture B to line 25. Under these new circumstances a third and different set of parallel current paths exist in winding 30. One path is from juncture B through coils 31, 32, 36, 35 in series to juncture C, and the other path is from juncture B through coils 33 and 34 to juncture C. This new third current set of paths produces another 30 degree clockwise advance of the magnetic flux orientation in the stationary armature, maintaining the average flux orientation between stationary armature 30, 42 and magnetized rotor 17 essentially in space quadrature and the rotor 17 continues to rotate clockwise.

After going through like operations, the rotor finally carries shield 21 and aperture 23 through 180 degrees of rotation where aperture 23 allows passage of light to photoelectric devices P-4 and P-5. Under these circumstances, P-4 operates switching element Q-4b which electrically connects juncture A to line 26, and P-5 operates switching elements Q-5a which electrically connects juncture C to line 25. Under these circumstances two parts of still different parallel current paths exist in winding 30. One part exists in coils 35 and 36 between junctures C and A, and the second part exists in coils 34, 33, 32, 31 in series between junctures C and A. These are the same parallel current paths that existed when P-1 and P-2 were illuminated except the direction of current flow is reversed in the winding paths. Thus, the magnetic flux orientation will also be reversed in direction, equivalent to being rotated 180 degrees.

Like action continues as the rotor rotates through 360 degrees. Thus, it is seen that there are twelve discrete sets of parallel current paths provided by the three coil portions 31 and 32, 33 and 34, 35 and 36 and juncture points A, B, C in conjunction with the associated switching operations. There are six different parallel current paths provided when only pairs of photoelectric devices are illuminated and there are six other different parallel current paths when groups of three photoelectric devices are illuminated for a small angle of overlap. Maximum efficiency occurs when the zones of overlap are kept to a minimum and in fact the zones of overlap are so small that they are neglected and motor 100 is deemed to have six commutating intervals.

This described action continues and the rotor rotates continually seeking magnetic alignment, but in rotating it carries shield 21 and aperture 23, operating the switching means which maintains the average armature flux orientation leading the rotor flux orientation essentially in space quadature. It is preferred that a condition of exact quadrature occur between rotor and stator when shield 21 and aperture 23 is symmetrical about pairs of photoelectric devices.

As best seen in FIGURES 5 and 6 magnetic frame 42 is provided with twelve poles 42a through 42l inclusive with one of the slots 1 through 12 inclusive interposed between adjacent poles. The utilization of a twelve slot magnetic frame reduces torque variation due to tooth pulsations and permits reasonable slot skew to further reduce such pulsations.

Only one armature coil side is disposed within each of the armature frames slots and for each phase the coils are concentric and are chorded. This is seen by considering the armature winding section of phase between taps A and B. This phase consists of two multi-turn coils 31, 32 connected in electrical series. However, for clarity of illustration these coils are shown in FIGURE 5 as consisting of a single turn. Starting at tap A, side 31a of coil 31 extends through slot 1 while side 31b of coil 31 extends through slot 6. Coil side 32a of coil 32 extends through slot 12 and is connected to coil side 31b. Coil side 32b of coil 32 extends through slot 7 and is connected to juncture B. When current flows between junctures A and B the currents through coil sides 31a, 32a in adjacent slots 1, 12 are in the same direction while currents through coil sides 31b, 32b in adjacent slots 6, 7 also flow in the same direction.

It is seen that each of the coils 31, 32 span five slots. That is, there are five poles 42b through 42f, inclusive, interposed between coil sides 31a, 31b and there are five poles 42h through 42l interposed between coil sides 32a, 32b. It is noted that the end view illustration of the armature coils in FIGURE 6 is schematic and that in the physical embodiment (see FIGURE 2) the coil ends do not extend in a straight line between slots but are curved outwardly toward shell 41.

Since the coils of the pair of coils for each of the other two armature phases are connected to each other and are mounted to frame 42 in the same manner as coils 31, 32, no further description of coils 33, 34, 35, 36 is contained herein.

Thus, it is seen that the instant invention provides a novel construction for a motor armature in which there is a pair of coils between each of the armature taps with each of the coils being mounted in chorded fashion to the magnetic frame. The armature winding is in a closed loop configuration having three taps; the armature has six coil sections; the magnetic frame has twelve slots and only a single coil side extends through each of the slots in the magnetic frame.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. An armature means for an electric motor including a pole structure and winding means mounted to said pole structure; said pole structure including an even number of poles arranged in a circular configuration with adjacent ones of said poles spaced from each other by slots in said pole structure; said winding means including an odd number of sections, at least three in number, each including a first coil having a first and second side for each of said first coils, the first and second sides disposed within different ones of said slots spaced apart by an odd number of said poles, said sections also including a second coil connected in circuit series with said first coil; each of said second coils having a first and second side; for each of said second coils the first and second sides thereof disposed within different ones of said slots spaced apart by an odd number of said poles, said first and said second sides of each of said coils being spaced apart by the same number of said poles, said coils positioned so that no more than one side of any one of said coils is disposed within each of said slots and said first and said second coils of each section being concentric.

2. The armature of claim 1 in which said sections are connected in series in a closed loop configuration.

3. The armature of claim 2 in which for each of said coils the first and second sides thereof are spaced apart by one less than half the number of said even number of poles.

4. The armature means of claim 3 in which for each of said sections said first sides are disposed in adjacent ones of said slots and said second sides are disposed in other adjacent ones of said slots.

5. The armature of claim 4 in which the sections of the winding means are three in number, said poles are twelve in number and each of said coils are multi-turned conductors.

References Cited

UNITED STATES PATENTS

| | | | |
|---|---|---|---|
| 2,823,363 | 2/1958 | McKenney et al. | 310—184 X |
| 3,054,010 | 9/1962 | Breitling | 310—254 |
| 3,201,627 | 8/1965 | Harrington | 310—198 |
| 3,257,572 | 6/1966 | Ludemann et al. | 310—258 X |
| 3,286,147 | 11/1966 | Parker et al. | 318—138 |

OTHER REFERENCES

Croft, Alternating-Current Armature Winding, 1924, pp. 32, 33, 67, 271.

WARREN E. RAY, *Primary Examiner.*

U.S. Cl. X.R.

310—202